Nov. 15, 1966 R. L. DUDLEY ET AL 3,286,247
POWER LEVELER INDICATOR HAVING AN OSCILLATOR MONITORED FEEDBACK CIRCUIT
Filed July 11, 1963
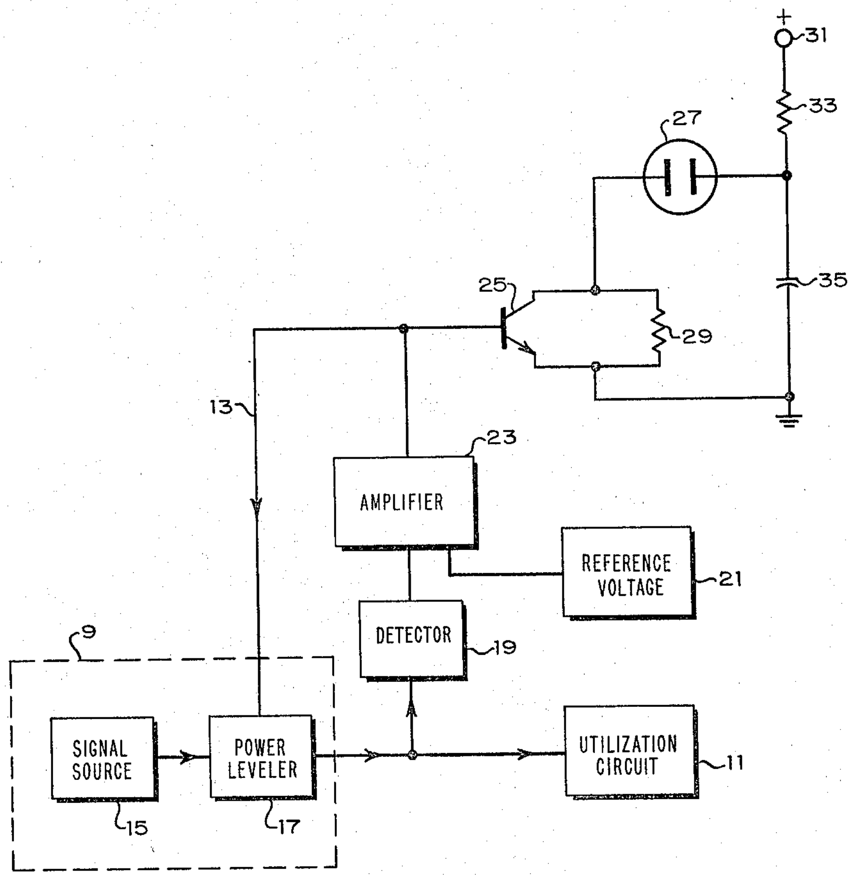
INVENTORS
ROBERT L. DUDLEY
SIEGFRIED H. LINKWITZ
BY [signature]
ATTORNEY 3,286,247

POWER LEVELER INDICATOR HAVING AN OSCILLATOR MONITORED FEEDBACK CIRCUIT

Robert L. Dudley, Cupertino, and Siegfried H. Linkwitz, Palo Alto, Calif., assignors to Hewlett-Packard Company, Palo Alto, Calif., a corporation of California Filed July 11, 1963, Ser. No. 294,345
3 Claims. (Cl. 340—248)

This invention relates to high frequency signal apparatus and more particularly to an indicator which provides a flashing indication when a feedback circuit providing power levelling of the high frequency signal is interrupted. Indicators of this type are particularly useful in swept frequency signal sources wherein the output power level varies as the output frequency is varied over a selected range. An indication thus provided informs the operator that the level of output power and hence the conditions under which the test may be performed are changed.

It is an object of the present invention to provide a power levelling feedback circuit with a gas tube indicator which flashes repetitively in response to conditions in the feedback circuit changing beyond the limits over which power levelling may be achieved.

In accordance with a preferred embodiment of the present invention the output power from a source of high frequency signal is controlled by an applied voltage of one polarity. A feedback circuit detects the output power and provides a power-correcting voltage to the source of signal. A gas tube arranged in a relaxation oscillator circuit is maintained in the ionized conduction state in the presence of a control voltage of the desired polarity applied to the signal source. If this control voltage applied to the signal source for levelling its output power drops below a selected value or changes polarity, the relaxation oscillator circuit breaks into oscillations and provides a flashing indication that output power is no longer levelled at a selected value.

The accompanying drawing shows a schematic diagram of a circuit according to the present invention. Circuit 9 supplies utilization circuit 11 with a high frequency signal which has a power level related to the control voltage applied to input 13. Circuit 9 may typically be a sweep frequency oscillator 15 and a signal-controlled power leveller of the type described in U.S. patent application Serial No. 141,661, issued to J. K. Hunton and A. G. Ryals on October 15, 1963, as U.S. Patent 3,107,335. The voltage which is produced by detector 19 and which is related to the power produced by circuit 9 is compared with the reference voltage 21. The difference between these voltages is amplified by amplifier 23. The output of amplifier 23 during normal circuit operation is of sufficient amplitude and polarity when applied to the power leveller 17 of circuit 9 to maintain the output power constant. The output of amplifier 23 is also applied to the input of transistor 25 to maintain the transistor non-conductive. The gas discharge tube 27 is connected to ground through the parallel combination of transistor 25 and resistor 29 and is connected to the positive terminal of the bias supply 31 through resistor 33. Thus, during the time that transistor 25 is rendered non-conductive the combination of resistors and the gaseous discharge tube 27 connected to capacitor 35 shows no effective negative resistance characteristic and thus the circuit is unable to oscillate. When the feedback circuit is rendered incapable of levelling the output power due, for example, to the power from signal source 15 falling below the level established by the setting of reference voltage

21, the output of amplifier 23 changes polarity. For an NPN transistor 25 as shown, the change is from negative to positive polarity. The positive voltage at the output of amplifier 23 is incapable of affecting the power produced by signal source 15 of circuit 9 when applied to the power leveller 17 but is capable of rendering transistor 25 heavily conductive. This connects gaseous discharge tube 27 to ground and to the positive bias supply 31 through resistor 33. As a result, the negative resistance characteristic of the gaseous discharge tube 27 in conjunction with the capacitor 35 is now sufficient to support relaxation oscillations in a manner which is commonly known.

Thus, the circuit of the present invention provides a flashing indication whenever the level of output power decreases below a selected value established by a reference voltage. During normal circuit operation however the circuit provides a continuous indication of normal power levelling operation. A circuit of this type is particularly suitable for use on a swept-frequency signal-generator for providing a front panel indication of a break in the power levelling feedback circuit at some portion of the range.

We claim:

1. Signalling apparatus comprising:
circuit means producing a high frequency signal having an output power which is related to the amplitude of a control voltage of one polarity applied thereto;
a low frequency oscillator adapted to be enabled in response to a voltage of the opposite polarity applied thereto;
feedback means adapted to produce a control voltage of one polarity for said power above a selected level and of the opposite polarity for said power below a selected level;
and means connected to said circuit means and to said oscillator for applying said control signal thereto.

2. Signalling apparatus comprising:
a signal generator for producing a high frequency signal having an output power which is related to the amplitude of a control voltage of one polarity applied thereto;
a low frequency oscillator adapted to be enabled in response to a voltage of the opposite polarity applied thereto;
a power detector connected to receive said high frequency signal;
a source of reference voltage;
means connected to the output of said detector and to said source of reference voltage for producing said control voltage as the difference between the voltage at the output of said detector and said reference voltage;
said control voltage having one polarity for the output of said detector above the reference voltage and having the opposite polarity for the output of said detector below the reference voltage;
and means connected to said signal generator and to said oscillator for applying said control signal thereto.

3. Signalling apparatus comprising:
circuit means producing a high frequency signal having an output power which is related to the amplitude of a control voltage of one polarity applied thereto;
a relaxation oscillator including a gaseous discharge tube, a capacitor, and polarity-sensitive switch, said switch being connected to inhibit oscillations in response to a voltage of said one polarity applied thereto and to activate said oscillator for oscillations in response to a voltage of opposite polarity applied thereto;

feedback means adapted to produce a control voltage of one polarity for said power above a selected level and of the opposite polarity of said power below a selected level;

and means connected to said circuit means and to said switch for applying said control signal thereto.

No references cited.

NEIL C. READ, *Primary Examiner.*

H. I. PITTS, *Assistant Examiner.*